J. DAILEY & D. BERTOLINO.
TIRE GRINDER.
APPLICATION FILED JULY 2, 1913.
1,092,026. Patented Mar. 31, 1914.
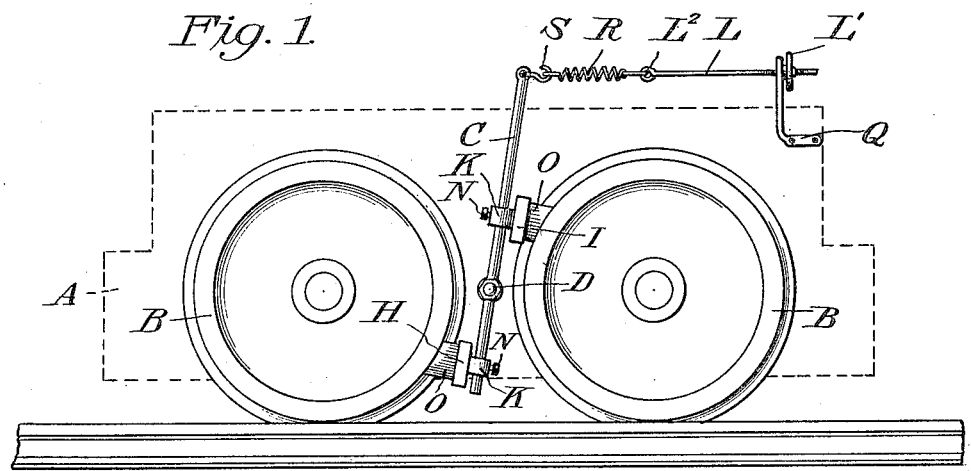
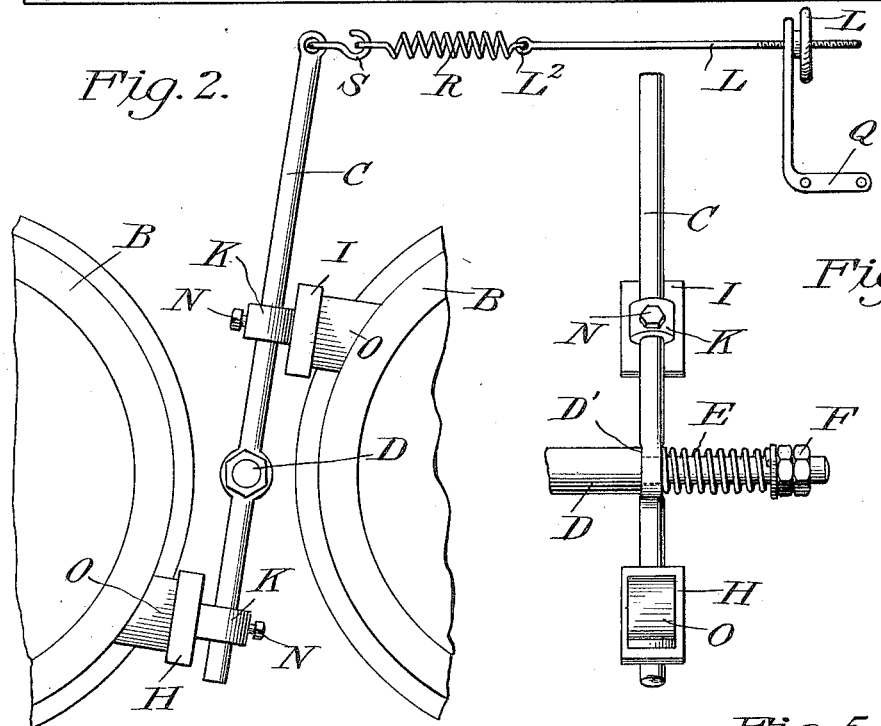
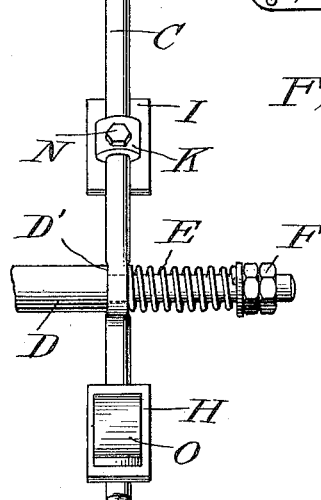
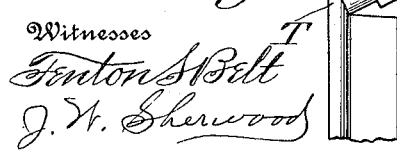
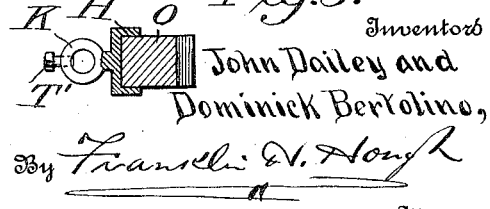
Inventors
John Dailey and
Dominick Bertolino,

UNITED STATES PATENT OFFICE.

JOHN DAILEY AND DOMINICK BERTOLINO, OF HEPZIBAH, WEST VIRGINIA.

TIRE-GRINDER.

1,092,026.

Specification of Letters Patent.

Patented Mar. 31, 1914.

Application filed July 2, 1913. Serial No. 777,085.

*To all whom it may concern:*

Be it known that we, JOHN DAILEY and DOMINICK BERTOLINO, citizen of the United States and subject of the King of Italy, respectively, residing at Hepzibah, in the county of Harrison and State of West Virginia, have invented certain new and useful Improvements in Tire-Grinders; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tire grinding devices designed for attachment to electric, gasolene haulage motors, etc., and comprises a simple and efficient device of this character which may be operated while the vehicle is in use without removing the tires from the wheels.

The invention comprises various details of construction and combinations and arrangements of parts which will be hereinafter fully described, shown in the accompanying drawings and then specifically defined in the appended claims.

Our invention is illustrated in the accompanying drawings, in which:—

Figure 1 is a side elevation showing the application of my grinding device to a motor truck. Fig. 2 is an enlarged detail view in elevation of the grinding apparatus. Fig. 3 is a view taken at right angles to the plane of the figure shown in Fig. 2. Fig. 4 is a detail view showing the manner of grinding the flange of a wheel, and Fig. 5 is an enlarged detail view of an emery block holding socket member.

Reference now being had to the details of the drawings by letter, A designates the body portion of a motor truck in which the flanged wheels B are mounted, and C designates a rod or bar which is pivotally mounted upon a stud D, which latter is adapted to be fastened in any suitable manner to the body of the vehicle, said stud being provided with a shouldered portion D', serving to limit the movement of said rod or bar C toward the vehicle. A coiled spring E is mounted upon a contracted portion of said stud and is held intermediate the lock nuts F and the rod or bar C, the tension of the spring being regulated by said nuts. Two socket members, designated respectively by letters H and I, have hollow eyes K adapted to receive the rod or bar C, and set screws N pass through threaded apertures in the eyes and are adapted to frictionally engage the bars C to hold the socket members in different adjusted positions. Each of said socket members is adapted to carry a grinding block O, preferably of metal or other suitable abrasive material.

A bracket member Q is adapted to be fastened to the body of the vehicle at any suitable location and a rod L passes through an aperture in said bracket member and a hand adjusting wheel L' is fitted upon the threaded portion of the rod and is adapted to bear against the bracket member to regulate the longitudinal movements of said rod. One end of the rod L has a hook $L^2$ which is connected to a coiled spring R which in turn is fastened to a hook S secured to one end of the rod or bar C. By the manipulation of the hand wheel L', it will be noted the tension of the spring R may be regulated to cause the two emery blocks to bear with varying degrees of pressure against the circumference of the wheel to be ground.

In Figs. 4 and 5 of the drawings, we have shown the adjustment of one of the socket members adapting the same to hold an emery block in convenient position to grind the flange T of a wheel, said socket member adapted to be held in an adjusted position by means of the set screw T'.

By the provision of an apparatus embodying the features of our invention, it will be noted that a simple and efficient grinding device is afforded which may be attached to the body portion of a vehicle without removing the tires upon various types of locomotives, affording means which may be operated while a motor is in daily use without removing the tires, thereby saving time and expense.

What we claim to be new is:—

1. An apparatus for grinding tires of wheels comprising, in combination with a vehicle with wheels thereon, a bar pivotally mounted upon the body of the vehicle, socket members adjustably mounted upon said bar, grinding blocks carried by said members, a spring fastened to one end of said bar and its other end to the body of the vehicle and adapted to hold the grinding blocks frictionally and yieldingly against the circumferences of the tires of the wheel, as set forth.

2. An apparatus for grinding tires of wheels comprising, in combination with a vehicle with wheels thereon, a bar pivotally mounted upon the body of the vehicle, socket members adjustably mounted upon said bar, grinding blocks carried by said members, a spring fastened at one end to said bar, a bracket member fastened to the body of the vehicle, a rod passing through an aperture in said bracket member and connected to said spring, and an adjusting wheel fitted upon the threaded portion of the rod and adapted to coöperate therewith and with said bracket member to regulate the tension of said spring, as set forth.

3. A device for grinding tires of wheels consisting, in combination with a vehicle body and wheels upon which the same is mounted, a stud bolt fastened to the body of the vehicle and having a shoulder thereon, a bar pivoted upon said bolt, a spring upon the latter, nuts upon the threaded end of the bolt and between which and said bar the spring is adapted to bear, adjustable socket members upon the bar, grinding blocks carried by said members, a bracket member fastened to the body of the vehicle, and tension means for varying the pressure of said grinding blocks against the circumference of the tires of the wheels, as set forth.

In testimony whereof we hereunto affix our signatures in presence of two witnesses.

JOHN DAILEY.
DOMINICK BERTOLINO.

Witnesses:
J. L. HOWARD,
H. C. COLLINS.

---

Copies of this patent may be obtained for five cents each, by addressing the "Commissioner of Patents, Washington, D. C."